(12) United States Patent
Saji et al.

(10) Patent No.: US 12,313,394 B2
(45) Date of Patent: May 27, 2025

(54) DEFORMATION CALCULATION DEVICE, DEFORMATION MEASUREMENT DEVICE, AND DEFORMATION CALCULATION METHOD

(71) Applicant: Mitsubishi Electric Corporation, Tokyo (JP)

(72) Inventors: Shigetaka Saji, Tokyo (JP); Norihiko Hana, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 134 days.

(21) Appl. No.: 18/035,930

(22) PCT Filed: Oct. 14, 2021

(86) PCT No.: PCT/JP2021/038001
§ 371 (c)(1),
(2) Date: May 9, 2023

(87) PCT Pub. No.: WO2022/172507
PCT Pub. Date: Aug. 18, 2022

(65) Prior Publication Data
US 2023/0417540 A1 Dec. 28, 2023

(30) Foreign Application Priority Data

Feb. 15, 2021 (JP) ................. 2021-021420

(51) Int. Cl.
*G01B 11/16* (2006.01)
(52) U.S. Cl.
CPC .................... *G01B 11/16* (2013.01)
(58) Field of Classification Search
CPC ............... G01B 11/16; G01N 21/9515; G01N 2021/8883; G01C 21/12; G06T 2207/30164; G06T 7/0004
(Continued)

(56) References Cited

U.S. PATENT DOCUMENTS

| | | | | |
|---|---|---|---|---|
| 5,757,473 A | * | 5/1998 | Kanduth | G01B 11/16 356/32 |
| 2003/0106378 A1 | * | 6/2003 | Giannakopoulos | G01B 21/32 73/788 |

(Continued)

FOREIGN PATENT DOCUMENTS

| | | |
|---|---|---|
| JP | 5013047 B2 | 8/2012 |
| WO | 2016/152076 A1 | 9/2016 |

OTHER PUBLICATIONS

International Search Report and Written Opinion mailed on Dec. 28, 2021, received for PCT Application PCT/JP2021/038001, filed on Oct. 14, 2021, 8 pages including English Translation.

*Primary Examiner* — Isiaka O Akanbi
(74) *Attorney, Agent, or Firm* — XSENSUS LLP

(57) ABSTRACT

The deformation calculation device includes: a deformation calculation unit which obtains a simply-calculated deformation of a measurement region by digital image correlation; a viewpoint change elimination unit which obtains a provisional deformation by subtracting, from the simply-calculated deformation, an apparent strain that is back-calculated on an assumption that there is no deformation in the measurement region; and a uniting unit which outputs, as a deformation of the measurement region from the first image-taking period to the second image-taking period, a deformation resulting from averaging the provisional deformations obtained by applying the deformation calculation unit and the viewpoint change elimination unit through sequential selection of different first images from the first image group and sequential selection of different second images from the second image group.

12 Claims, 14 Drawing Sheets

(58) Field of Classification Search
USPC .......................................................... 356/35
See application file for complete search history.

(56) References Cited

U.S. PATENT DOCUMENTS

| | | | |
|---|---|---|---|
| 2015/0124264 A1* | 5/2015 | Ramachandran .. | G02B 6/02076 |
| | | | 356/601 |
| 2018/0106609 A1 | 4/2018 | Imai | |
| 2019/0212130 A1* | 7/2019 | Wang ................... | G01B 11/165 |
| 2020/0041255 A1* | 2/2020 | Ahmed .............. | G02B 27/1006 |
| 2020/0041256 A1* | 2/2020 | Ahmed .............. | G01B 9/02018 |
| 2022/0114713 A1* | 4/2022 | Liu ........................ | G06T 7/001 |
| 2022/0276045 A1* | 9/2022 | Hana ....................... | G01B 21/32 |
| 2022/0407393 A1* | 12/2022 | Hana .................... | G01R 31/346 |

* cited by examiner

DEFORMATION CALCULATION DEVICE, DEFORMATION MEASUREMENT DEVICE, AND DEFORMATION CALCULATION METHOD

CROSS-REFERENCE TO RELATED APPLICATIONS

The present application is based on PCT filing PCT/JP2021/038001, filed Oct. 14, 2021, which claims priority to JP 2021-021420, filed Feb. 15, 2021, the entire contents of each are incorporated herein by reference.

TECHNICAL FIELD

The present disclosure relates to a deformation calculation device, a deformation measurement device, and a deformation calculation method.

BACKGROUND ART

As a method for measuring a deformation of an object, digital image correlation has been known in which images of one measurement target that are taken during a first image-taking period and a second image-taking period different from each other are compared with each other so that a deformation is measured in a contactless manner. In digital image correlation, the displacement amount of an image-taking region is detected by using a luminance value distribution correlation. This detection is based on the feature in which: a diffuse reflection image of an object surface moves along with the object surface; and a luminance value distribution of the diffuse reflection image is saved during each of the first image-taking period and the second image-taking period. A displacement and a strain at which the correlation between a luminance value of a pre-deformation image and a luminance value of a post-deformation image becomes maximum are searched for at each of positions on the images, whereby a deformation of the measurement target is determined. In digital image correlation, if the relative position between a camera and a subject differs between the first image-taking period and the second image-taking period, movement and enlargement/reduction of the measurement target occur on the taken images, whereby an apparent deformation occurs. Thus, if the relative position between the camera and the measurement target differs between the first image-taking period and the second image-taking period, a problem arises in that a deformation of the measurement target cannot be correctly measured.

Against this problem, there is the following method. That is, images of a measurement target are taken by a plurality of cameras disposed at mutually different positions so that the relative position between each of the cameras and the measurement target is measured according to the principle of stereoscopic vision, whereby a deformation of the measurement target is measured with elimination of influence of a change in the relative position between the camera and the measurement target. However, since the plurality of cameras need to be disposed at mutually different positions, a measurement system tends to be complicated and upsized. In addition, since the mutual positional relationship among the plurality of cameras needs to be accurately measured, labor required for measurement becomes greater than that in the case of using one camera. Considering this, methods for measuring a deformation through compensation for a change in the position relative to a measurement target even with one camera have been proposed in order to realize easier deformation measurement.

As one of the methods for measuring a deformation through compensation for a change in the position relative to a measurement target with one camera, a method has been proposed in which, for a deformation amount detected by digital image correlation, a reference region subjected to neither displacement nor strain is set in an image-taking region, a coordinate transformation formula indicating the relationship between a coordinate position on an image taken before the deformation and a coordinate position on an image taken after the deformation is obtained, and an error based on a movement of a camera is subtracted from the measured displacement amount (see, for example, Patent Document 1).

CITATION LIST

Patent Document

Patent Document 1: Japanese Patent No. 5013047

SUMMARY OF THE INVENTION

Problems to be Solved by the Invention

In the technology of Patent Document 1, an object the position of which does not differ between before and after deformation of the measurement target, has to be included in the image-taking region as a reference point for measuring the relative position between the camera and the measurement target. Thus, a problem arises in that a deformation cannot be measured if it is difficult to provide an unmoving reference point, e.g., if the range of deformation of the measurement target extends over the entirety of the image-taking region.

The present disclosure has been made to solve the above problems, and an object of the present disclosure is to provide a deformation calculation device that calculates a deformation through compensation for a change in the position relative to a measurement target with one camera even in the absence of an unmoving reference point.

Solution to the Problems

A deformation calculation device according to the present disclosure includes: a deformation calculation unit which obtains a simply-calculated deformation of a measurement region by digital image correlation with use of one first image selected from a first image group composed of first images, of the measurement region, that are taken from mutually different relative positions during a first image-taking period and one second image selected from a second image group composed of second images, of the measurement region, that are taken from mutually different relative positions during a second image-taking period different from the first image-taking period; a viewpoint change elimination unit which obtains a provisional deformation by subtracting, from the simply-calculated deformation, an apparent strain that is back-calculated on an assumption that there is no deformation in the measurement region; and a uniting unit which outputs, as a deformation of the measurement region from the first image-taking period to the second image-taking period, a deformation resulting from averaging the provisional deformations obtained by applying the deformation calculation unit and the viewpoint change elimination unit through sequential selection of different ones of the first images from the first image group and sequential selection of different ones of the second images from the second image group.

Effect of the Invention

The deformation calculation device according to the present disclosure includes: a deformation calculation unit which obtains a simply-calculated deformation of a measurement region by digital image correlation with use of one first image selected from a first image group composed of first images, of the measurement region, that are taken from mutually different relative positions during a first image-taking period and one second image selected from a second image group composed of second images, of the measurement region, that are taken from mutually different relative positions during a second image-taking period different from the first image-taking period; a viewpoint change elimination unit which obtains a provisional deformation by subtracting, from the simply-calculated deformation, an apparent strain that is back-calculated on an assumption that there is no deformation in the measurement region; and a uniting unit which outputs, as a deformation of the measurement region from the first image-taking period to the second image-taking period, a deformation resulting from averaging the provisional deformations obtained by applying the deformation calculation unit and the viewpoint change elimination unit through sequential selection of different ones of the first images from the first image group and sequential selection of different ones of the second images from the second image group. Consequently, a deformation can be calculated through compensation for a change in the position relative to a measurement target with one camera even in the absence of an unmoving reference point.

DESCRIPTION OF EMBODIMENTS

Figure 1:
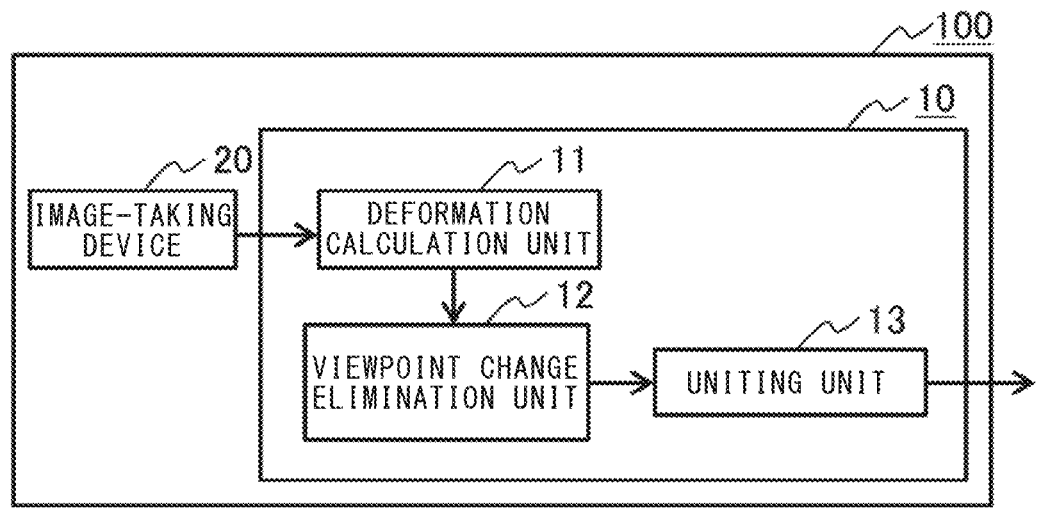
FIG. 1 is a block diagram showing a configuration of a deformation calculation device in embodiment 1.

Hereinafter, deformation calculation devices according to embodiments for carrying out the present disclosure will be described in detail with reference to the drawings. The same or corresponding components in the drawings are denoted by the same reference characters.

Embodiment 1

FIG. 1 is a block diagram showing a configuration of a deformation calculation device 10 in embodiment 1. As shown in FIG. 1, the deformation calculation device 10 includes a deformation calculation unit 11, a viewpoint change elimination unit 12, and a uniting unit 13. A deformation measurement device 100 includes the deformation calculation device 10 and an image-taking device 20.

The deformation calculation device 10 in embodiment 1 is used in deformation measurements for various purposes such as: deformation measurement for a test piece in a laboratory; or inspection of a change in the shape of infrastructure equipment having occurred over time. Hereinafter, operation of the deformation calculation device 10 performed by digital image correlation will be described by taking, as an example, a case of measuring a change in strain of a structure forming infrastructure equipment on the assumption that the infrastructure equipment is inspected. A case is assumed where: a first time of inspection is conducted during a first image-taking period; and a second time of inspection is conducted during a second image-taking period subsequent to use of the equipment over a certain period from the first image-taking period. An image, of the structure, that is taken by the image-taking device 20 during the first image-taking period and an image, of the structure, that is taken by the image-taking device 20 during the second image-taking period are compared with each other by digital image correlation, whereby inspection is conducted as to degradation of a machine part caused by operation of the equipment. Hereinafter, descriptions will be given while: the structure, an image of which is to be taken, is defined as a subject; and a range, on a surface of the structure, within which deformation is to be measured is defined as a measurement region.

In a case where an image of the structure forming the infrastructure equipment is taken, it is difficult to set the relative position between the subject and a camera as the image-taking device 20 to be completely the same between the first image-taking period and the second image-taking period. As a result, in a case where a change in the shape of the subject is measured by digital image correlation with use of an image, of the subject, that is taken during the first image-taking period and an image, of the subject, that is taken during the second image-taking period, a movement amount based on a change in the relative position between the camera and the subject is included as an error. Thus, it becomes difficult to accurately measure the change in the shape of the subject. In addition, in a situation where, for example, the subject is disposed in a narrow site, the distance between the subject and the camera cannot be made long, whereby the subject might occupy the entirety of the image-taking range of the camera. In such a case, it is difficult to cause the image-taking range of the camera to include a reference point at which no displacement occurs in the subject. Thus, in the case of using a technology that requires a reference point for measuring the relative position between the camera and the subject, it is difficult to obtain the relative position between the camera and the subject. Hereinafter, operation of the deformation calculation device 10 in embodiment 1 which does not require any reference point for measuring the relative position between the image-taking device 20 and the subject, will be described.

Figure 2:
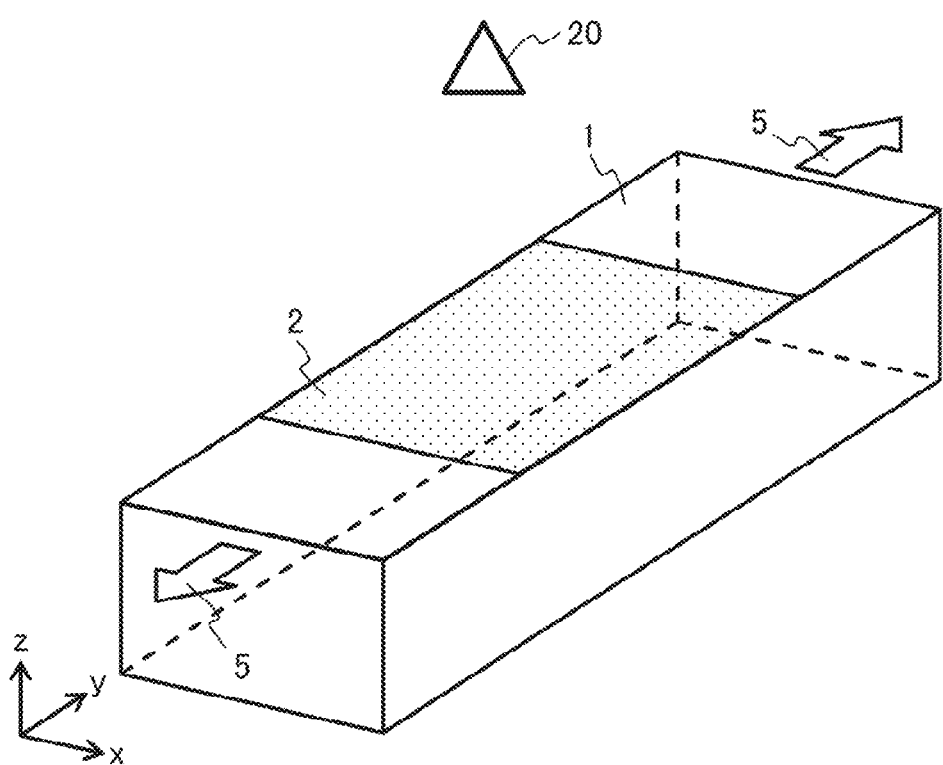
FIG. 2 is a perspective view of a structure to which each of tensile loads has been applied, in embodiment 1.
Figure 3:
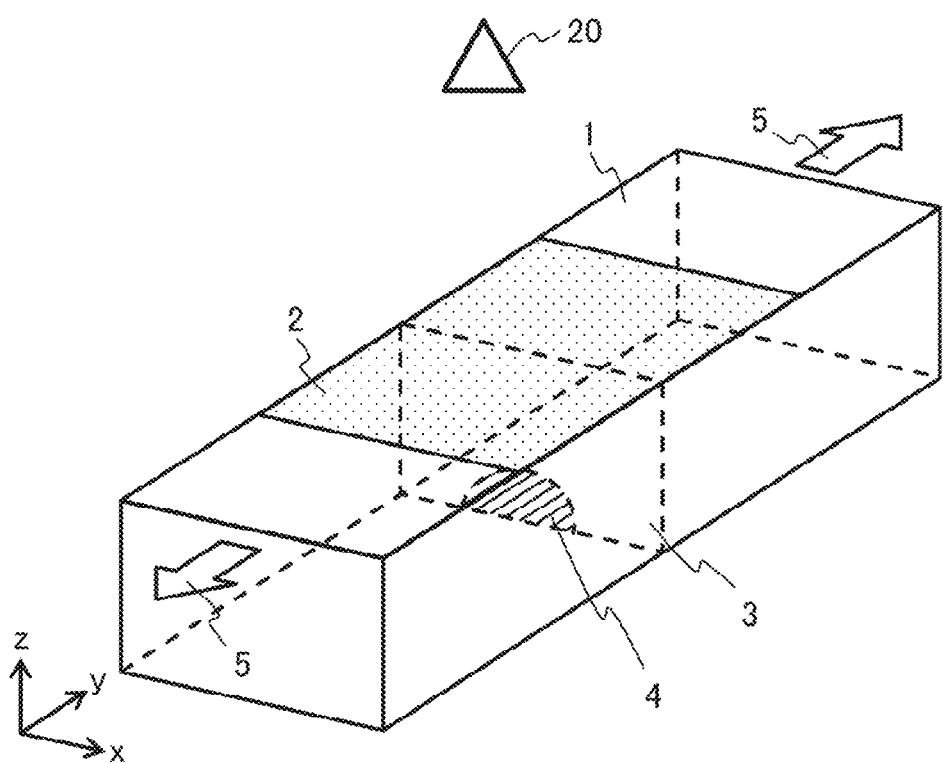
FIG. 3 is a perspective view of the structure in which a defect has been generated, in embodiment 1.

A structure 1 such as one shown in each of FIG. 2 and FIG. 3 is assumed as a subject to be measured regarding a change in the shape thereof by the deformation calculation device 10 in embodiment 1. The structure 1 is subjected to application of each of tensile loads 5 in the longitudinal direction of the structure 1 and has a rectangular cross-sectional shape. A measurement region 2 is set on a surface of the structure 1. In FIG. 2 and FIG. 3, the structure 1 is represented in an orthogonal coordinate system, the plane on which the measurement region 2 is set is defined as an xy-plane, and an axis perpendicular to the xy-plane is defined as a z-axis. FIG. 2 shows the structure 1 during the first image-taking period, and FIG. 3 shows the structure 1 during the second image-taking period. The structure 1 has an even cross section during the first image-taking period shown in FIG. 2, but suffers a defect 4 in a defect region 3 thereof during the second image-taking period shown in FIG. 3. As a result, a change in the shape occurs in the measurement region 2 during the second image-taking period shown in FIG. 3. In the deformation calculation device 10 in embodiment 1, an image of the measurement region 2 of the structure 1 is taken by the image-taking device 20 during the first image-taking period, an image of the measurement region 2 of the structure 1 is taken by the image-taking device 20 during the second image-taking period, and a deformation, of the measurement region 2, based on the defect 4 is calculated from the images by digital image correlation. The calculated deformation of the measurement region 2 is used for, for example, estimating a position and a scale of the defect 4.

A random pattern is desirably formed in advance on the measurement region 2 of the structure 1. The random pattern refers to an isotropic pattern without any repetition and desirably has a high contrast. In the measurement region 2 of the structure 1, the random pattern is formed by, for example, applying a whitish paint and then applying a blackish paint through spraying. If a random pattern having a high contrast is originally present on the surface, of the structure 1, on which the measurement region 2 has been set, no paint has to be applied. Examples of the surface, of the structure 1, that originally has a random pattern having a high contrast include a concrete surface and the like.

The image-taking device 20 takes an image of the measurement region 2 during the first image-taking period and outputs the image. Further, the image-taking device 20 takes an image of the measurement region 2 during the second image-taking period and outputs the image. In the deformation calculation device 10, the image, of the measurement region 2, that is taken by the image-taking device 20 during the first image-taking period and the image, of the measurement region 2, that is taken by the image-taking device 20 during the second image-taking period are compared with each other by digital image correlation, to calculate a deformation of the measurement region 2.

Figure 4:
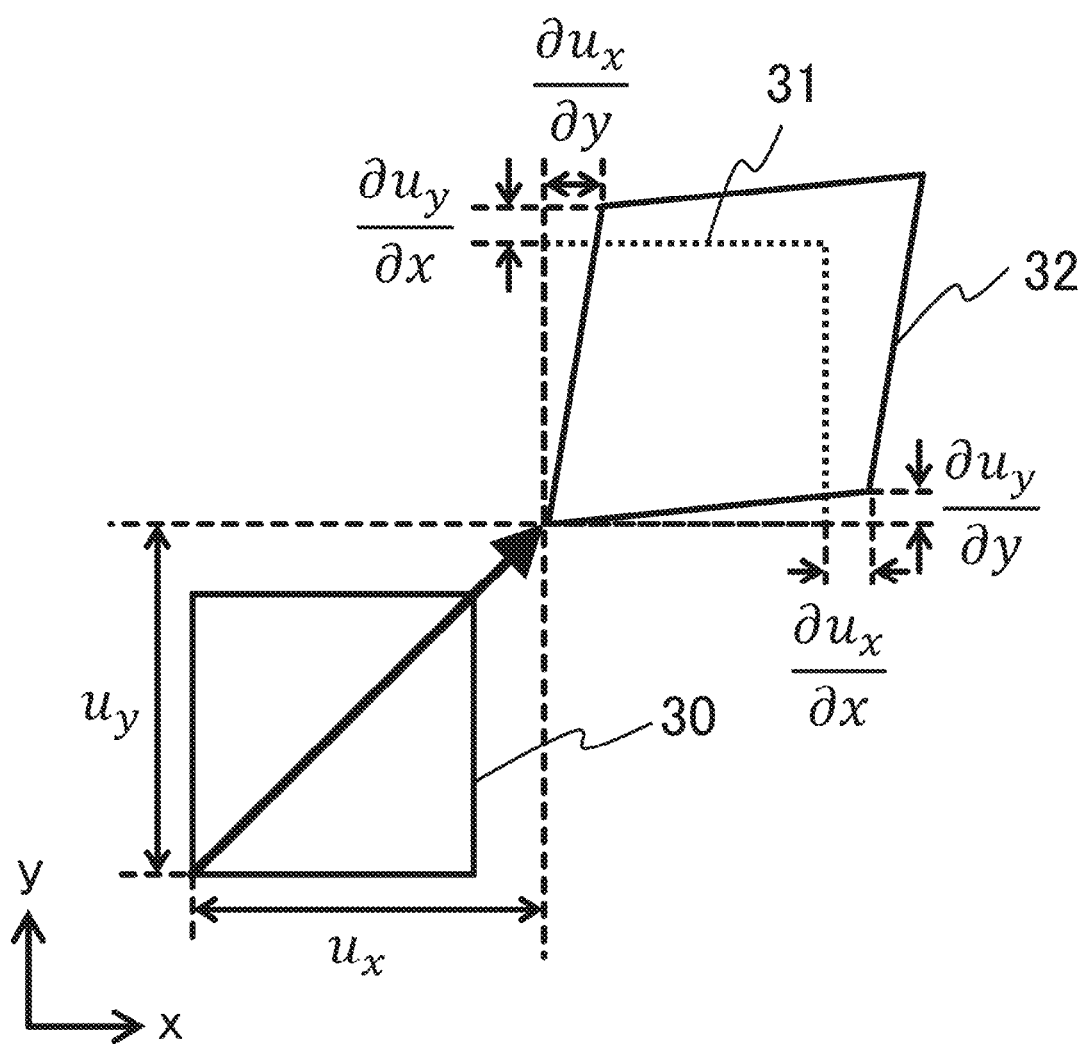
FIG. 4 is a diagram for explaining deformation, displacement, and strain in the present disclosure.

FIG. 4 is a diagram for explaining deformation, displacement, and strain in the present disclosure. In the present disclosure, deformation will be described as a collective term encompassing displacement and strain. A pre-deformation region 30 indicates a specific region in the measurement region 2 observed during the first image-taking period. A region 31 having been subjected to deformation involving only displacement indicates a specific region in the measurement region 2 observed during the second image-taking period in the case where deformation involves only displacement. In this case, the displacement is expressed with $u_x$ and $u_y$. A region 32 having been subjected to deformation involving displacement and strain indicates a specific region in the measurement region 2 observed during the second image-taking period in the case where deformation involves both displacement and strain. In this case, the displacement is expressed with $u_x$ and $u_y$, and the strain is expressed with $\partial u_x/\partial x$, $\partial u_y/\partial y$, $\partial u_y/\partial x$, and $\partial u_x/\partial y$.

Hereinafter, details of operations of the image-taking device 20 and the deformation calculation device 10 will be described. The image-taking device 20 takes an image of the measurement region 2 a plurality of times during the first image-taking period and outputs a plurality of images which compose a first image group. In addition, the image-taking device 20 takes an image of the measurement region 2 a plurality of times during the second image-taking period and outputs a plurality of images which compose a second image group. The image-taking device 20 takes an image of the measurement region 2 two or more times and preferably ten or more times during the first image-taking period, and outputs data of two or more and preferably ten or more images which compose the first image group. The images in the first image group may be images taken and acquired as still images in succession or may be images obtained by taking a moving image and extracting a plurality of frames as still images from the moving image. The images to be included in the first image group are taken such that the relative position of the image-taking device 20 relative to the measurement region 2 differs among the images. The method for changing the relative position between the measurement region 2 and the image-taking device 20 may involve: parallel movement of the image-taking device 20 relative to the measurement region 2; change of the distance between the measurement region 2 and the image-taking device 20; or change of the angle of the image-taking device 20 relative to the measurement region 2. Further, two or more of the parallel movement, the change of the distance, and the change of the angle may be simultaneously performed.

The image-taking device 20 takes an image of the measurement region 2 two or more times and preferably ten or more times during the second image-taking period, and outputs data of two or more and preferably ten or more images which compose the second image group. The images in the second image group may be images taken and acquired as still images in succession or may be images obtained by taking a moving image and extracting a plurality of frames as still images from the moving image. The images to be included in the second image group are taken such that the relative position of the image-taking device 20 relative to the measurement region 2 differs among the images. The method for changing the relative position between the measurement region 2 and the image-taking device 20 may involve: parallel movement of the image-taking device 20 relative to the measurement region 2; change of the distance between the measurement region 2 and the image-taking device 20; or change of the angle of the image-taking device 20 relative to the measurement region 2. Further, two or more of the parallel movement, the change of the distance, and the change of the angle may be simultaneously performed.

The deformation calculation unit 11 acquires the first image group and the second image group which are outputs from the image-taking device 20. The deformation calculation unit 11 selects, as a first image, one image from the first image group and selects, as a second image, one image from the second image group. The deformation calculation unit 11 calculates a change, in the shape of the measurement region 2 included in the second image, from the shape of the measurement region 2 included in the first image by digital image correlation, calculates two-dimensional distributions of displacements and strains, and outputs these two-dimensional distributions of displacements and strains as a simply-calculated deformation. In addition, the deformation calculation unit 11 outputs, together with the simply-calculated deformation, the first image and the second image having been used for calculating the simply-calculated deformation. The relative position between the measurement region 2 and the image-taking device 20 differs between the first image-taking period and the second image-taking period. Thus, in the simply-calculated deformation which is an output from the deformation calculation unit 11, an apparent displacement and an apparent strain based on a change in the viewpoint are superimposed in a deformation of the measurement region 2.

Figure 5:
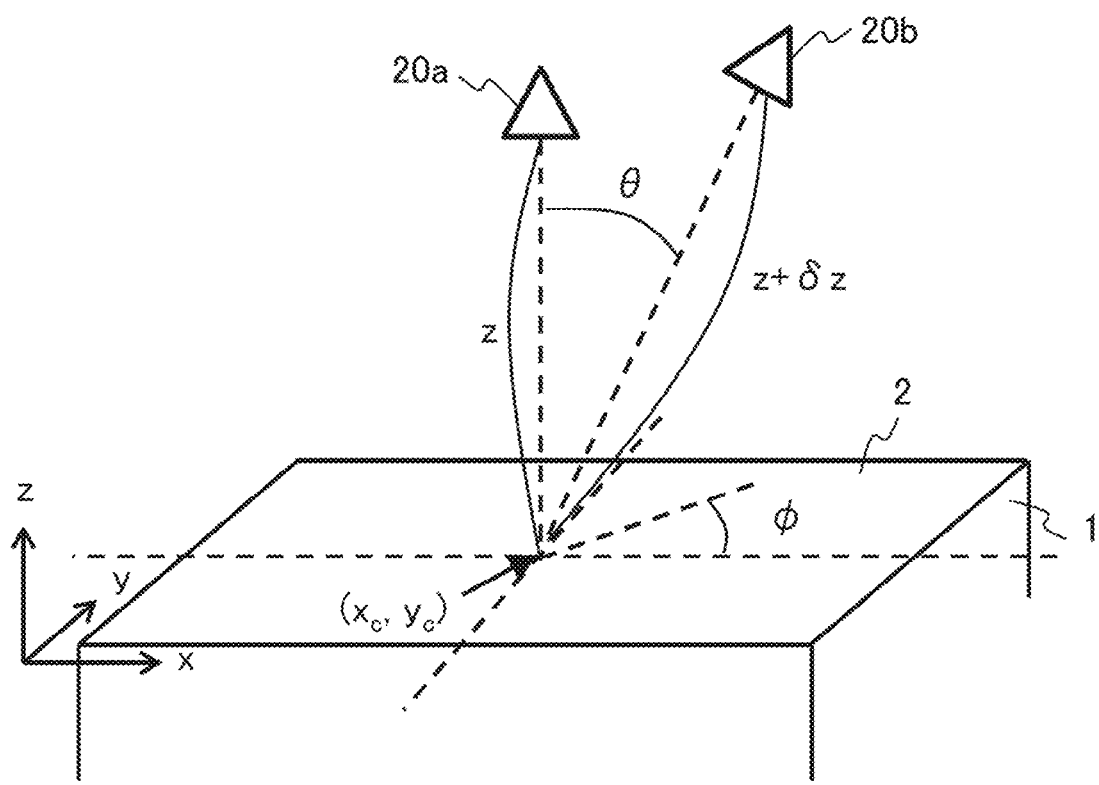
FIG. 5 is a diagram for explaining an apparent deformation based on a movement of an image-taking device in embodiment 1.

The viewpoint change elimination unit 12 obtains a provisional deformation which is two-dimensional distributions of displacements and strains of the measurement region 2 on the basis of the simply-calculated deformation, the first image, and the second image which are outputs from the deformation calculation unit 11. The viewpoint change elimination unit 12 outputs the obtained provisional deformation. FIG. 5 is a diagram for explaining an apparent deformation based on a movement of the image-taking device 20. In FIG. 5, in the same manner as in FIG. 2 and FIG. 3, the structure 1 is represented in the orthogonal coordinate system, the plane on which the measurement region 2 is set is defined as an xy-plane, and the axis perpendicular to the xy-plane is defined as a z-axis. FIG. 5 shows a part of a situation where images of the measurement region 2 of the structure 1 are taken during the first image-taking period and the second image-taking period. An image, of the measurement region 2, that is taken from the position of an image-taking device 20a during the first image-taking period is the first image, and an image, of the measurement region 2, that is taken from the position of an image-taking device 20b during the second image-taking period is the second image. An apparent strain x, in an x-direction at an attention point (x, y) on the measurement region 2 shown in the second image, of the measurement region 2, that is taken from the position of the image-taking device 20b relative to an attention point (x, y) on the measurement region 2 shown in the first image, of the measurement region 2, that is taken from the position of the image-taking device 20a, is approximately obtained according to the following expression (1).

[Mathematical 1]
$$x_s = \frac{z - \delta z}{(z - ((x - x_c)\cos\phi\sin\theta + (y - y_c)\sin\phi\sin\theta))\sqrt{1 + \cos^2\phi\tan^2\theta}} - 1 \quad (1)$$

In FIG. 5 and expression (1), ($x_c$, $y_c$) represents the rotational center coordinates of the position of the image-taking device 20b relative to the position of the image-taking device 20a, z represents the distance from the position of the image-taking device 20a to the measurement region 2, $\delta z$ represents a change from the distance between the point ($x_c$, $y_c$) and the position of the image-taking device 20a to the distance between the point ($x_c$, $y_c$) and the position of the image-taking device 20b, $\theta$ represents the amount of change in the rotation angle of the position of the image-taking device 20b relative to the position of the image-taking device 20a, and $\varphi$ represents a direction of rotation of the position of the image-taking device 20b relative to the position of the image-taking device 20a.

In other words, ($x_c$, $y_c$) represents the coordinates of a point, on the xy-plane as a plane of the measurement region 2, at which a perpendicular line drawn downward from the image-taking device 20a having taken the first image intersects with the xy-plane, z represents the distance between the image-taking device 20a and the point ($x_c$, $y_c$), and z+$\delta z$ represents the distance between the image-taking device 20b and the point ($x_c$, $y_c$). $\theta$ represents an angle formed by a direction from the point ($x_c$, $y_c$) to the image-taking device 20a and a direction from the point ($x_c$, $y_c$) to the image-taking device 20b. $\varphi$ represents an angle formed by the x-axis and a line segment that is a projection, on the xy-plane, of a line segment connecting the point ($x_c$, $y_c$) and the image-taking device 20b to each other.

If the six coefficients $\theta$, $\varphi$, $x_c$, $y_c$, z, and $\delta z$ in expression (1) can be obtained, a strain that is included in the simply-calculated deformation as an output from the deformation calculation unit 11 and that is based on the movement of the image-taking device 20 can be back-calculated. The viewpoint change elimination unit 12 determines, for each of at least six different attention points (x, y) on the measurement region 2, the six coefficients $\theta$, $\varphi$, $x_c$, $y_c$, z, and $\delta z$ such that the difference between the simply-calculated deformation as an output from the deformation calculation unit 11 and the strain $x_s$, obtained according to expression (1), in the x-direction at the attention point (x, y) on the measurement region 2 becomes minimum. The strain $x_s$, in the x-direction, expressed with expression (1) for which the six coefficients have been determined is regarded as an apparent deformation based on the movement of the image-taking device 20, and, if the apparent deformation is subtracted from the simply-calculated deformation as an output from the deformation calculation unit 11, a provisional deformation as a two-dimensional distribution of displacements of the measurement region 2 can be obtained.

An apparent strain $y_s$ in a y-direction at the attention point (x, y) on the measurement region 2 shown in the second image, of the measurement region 2, that is taken from the position of the image-taking device 20b relative to the attention point (x, y) on the measurement region 2 shown in the first image, of the measurement region 2, that is taken from the position of the image-taking device 20a, is approximately obtained according to the following expression (2).

[Mathematical 2]
$$y_s = \frac{z - \delta z}{(z - ((x - x_c)\cos\phi\sin\theta + (y - y_c)\sin\phi\sin\theta))} - 1 \quad (2)$$

In the same manner as that for the strain $x_s$ in the x-direction, if the six coefficients $\theta$, $\varphi$, $x_c$, $y_c$, z, and $\delta z$ in expression (2) can be obtained, a strain that is included in the simply-calculated deformation as an output from the deformation calculation unit 11 and that is based on the movement of the image-taking device 20 can be back-calculated. The viewpoint change elimination unit 12 determines, for each of at least six different attention points (x, y) on the measurement region 2, the six coefficients θ, φ, $x_c$, $y_c$, z, and δz such that the difference between the simply-calculated deformation as an output from the deformation calculation unit 11 and the strain $y_s$, obtained according to expression (2), in the y-direction at the attention point (x, y) on the measurement region 2 becomes minimum. The strain $y_s$, in the y-direction, expressed with expression (2) for which the six coefficients have been determined is regarded as an apparent deformation based on the movement of the image-taking device 20, and, if the apparent deformation is subtracted from the simply-calculated deformation as an output from the deformation calculation unit 11, a provisional deformation as a two-dimensional distribution of displacements of the measurement region 2 can be obtained. Each of the provisional deformations obtained as above by subtracting the strain in the x-direction and the strain in the y-direction from the simply-calculated deformation is outputted from the viewpoint change elimination unit 12.

In the above descriptions, apparent strains based on a change in the viewpoint are expressed in a case where the measurement region 2 has a flat surface. Even in a case where the surface of the structure 1 has a complex shape, if the surface locally has a flat region that has a low curvature and that can be regarded as a flat surface, the flat region is set as the measurement region 2, and an apparent strain $y_s$ in the y-direction at the attention point (x, y) on the measurement region 2 can be obtained according to expressions (1) and (2). Consequently, local deformation on a wall surface of a structure, e.g., a building or a bridge, having a plurality of locally-flat surfaces can be calculated.

In a case where the measurement region 2 has no flat surface, e.g., in a case where the measurement region 2 has a spherical shape, if the radius of the sphere and three values indicating a position in the x-, y-, and z-directions of the center of the sphere, i.e., a total of four parameters, are added to expressions (1) and (2) as geometrically calculated correction terms, apparent strains of the measurement region 2 based on a change in the viewpoint can be expressed. In a case where the measurement region 2 has a columnar shape, if, with an axis parallel to the central axis of the column being defined as an x-axis, the radius of the column, two values indicating a position in the y- and z-directions of the central axis of the column, and the x-axis in a direction in which the central axis of the column extends, i.e., a total of four parameters, are added to expressions (1) and (2) as geometrically calculated correction terms, apparent strains of the measurement region 2 based on a change in the viewpoint can be expressed. This method enables, for example, calculation of a deformation of a structure having a circular shape such as a pipe or a tank.

Even in a case where the measurement region 2 has a surface other than a flat surface, a spherical surface, and a columnar surface, if correction terms corresponding to the shape of the measurement region 2 are added to expressions (1) and (2), a deformation of a structure having the said shape can be calculated. In the case where the measurement region 2 has a flat surface, the number of parameters necessary for obtaining apparent strains based on a change in the viewpoint is smaller, and thus, calculation by the viewpoint change elimination unit 12 can be performed in a shorter time than in the case where the measurement region 2 has no flat surface.

It is also possible to: further provide a distance measurement device which measures a change, in the relative position between the image-taking device 20 and the measurement region 2, that has occurred between the first image-taking period and the second image-taking period; and obtain, by the viewpoint change elimination unit 12, the apparent strains by further using information about the change in the relative position which is an output from the distance measurement device. The distance measurement device is, for example, an ultrasonic gap sensor, a laser displacement meter, a contact-type displacement meter, or the like. The change in the relative position to be outputted from the distance measurement device is, for example, a change in the distance from the image-taking device 20 to the surface of the measurement region 2 when the measurement region 2 is viewed in a predetermined direction from the image-taking device 20. In a case where the distance measurement device is configured to measure a change in the relative position in one direction from the image-taking device 20 to the measurement region 2, the viewpoint change elimination unit 12 can obtain the coefficient z and the coefficient δz in expression (1) and expression (2) on the basis of information about the change in the relative position which is an output from the distance measurement device. In a case where the distance measurement device is configured to measure changes in the relative position in three or more different directions from the image-taking device 20 to the measurement region 2, or in a case where three or more distance measurement devices disposed at mutually different positions are used, the viewpoint change elimination unit 12 can obtain all the coefficients in expression (1) and expression (2) on the basis of information about the changes in the relative position. In this method, changes in the relative position between the image-taking device 20 and the measurement region 2 are measured independently of an image from which a deformation is measured, whereby influence of an error of the deformation obtained by image correlation at the time of obtaining the coefficients in expression (1) and expression (2) is not inflicted. Consequently, this method enables improvement of measurement accuracy.

If the structure 1 is not moved, it is also possible to: further provide an orientation measurement device which measures a change, in the orientation of the image-taking device 20, that has occurred between the first image-taking period and the second image-taking period; and obtain, by the viewpoint change elimination unit 12, apparent strains by further using information about the change in the orientation which is an output from the orientation measurement device. The orientation measurement device is, for example, a gyro sensor, a motion tracking device, or the like. The coefficient θ and the coefficient (in expression (1) and expression (2) can be determined from the information about the change in the orientation which is an output from the orientation measurement device. Alternatively, it is also possible to: further provide a motion tracking device which measures a positional change and a rotational change, of the image-taking device 20, that have occurred between the first image-taking period and the second image-taking period; and obtain, by the viewpoint change elimination unit 12, apparent strains by further using information about the positional change and the rotational change which are outputs from the motion tracking device. All the coefficients in expression (1) and expression (2) can be determined from the information about the positional change and the rotational change which are outputs from the motion tracking device. In this method, information about the relative position between the image-taking device 20 and the measurement region 2 is not used, and thus, even when the measurement region 2 is significantly deformed, apparent strains based on a change in the viewpoint can be calculated. Consequently, this method enables accurate measurement of deformation.

The deformation calculation unit 11 has been described as selecting, as a first image, one image from the first image group and selecting, as a second image, one image from the second image group. Regarding this, the deformation calculation unit 11 sequentially selects different first images from the first image group and sequentially selects different second images from the second image group. Consequently, the processes by the deformation calculation unit 11 and the viewpoint change elimination unit 12 are performed on all combinations of the images included in the first image group and the images included in the second image group. Specifically, in a case where the first image group includes m images and the second image group includes n images, selection is performed to obtain m*n combinations as combinations of the first images and the second images, and the processes by the deformation calculation unit 11 and the viewpoint change elimination unit 12 are performed on each of the combinations of the images, whereby m*n provisional deformations are obtained.

Although the deformation calculation unit 11 has been described as outputting the first image and the second image having been used for calculating the simply-calculated deformation and the viewpoint change elimination unit 12 has been described as receiving the first image and the second image from the deformation calculation unit 11, the deformation calculation unit 11 may output only the simply-calculated deformation, and the viewpoint change elimination unit 12 may receive the first image and the second image from the image-taking device 20. Alternatively, data of the first image group and the second image group which are outputs from the image-taking device 20 may be saved in a storage unit inside the deformation calculation device 10, and the deformation calculation unit 11 and the viewpoint change elimination unit 12 may read out the data of the first image and the second image from the storage unit. The storage unit is implemented by, for example, a memory. The memory is, for example, a semiconductor memory, a magnetic disk, or the like.

Further, descriptions have been given regarding a feature in which, in the case where the first image group includes m images and the second image group includes n images: selection is performed to obtain m*n combinations as combinations of the first images and the second images; and the processes by the deformation calculation unit 11 and the viewpoint change elimination unit 12 are performed on each of the combinations of the images. However, it is also possible to employ a feature in which, in the same case: selection is performed to obtain m*n combinations as combinations of the first images and the second images; the process by the deformation calculation unit 11 is performed on all the combinations; the result of the process is saved in the storage unit inside the deformation calculation device 10; and then the process by the viewpoint change elimination unit 12 is performed on each of the m*n combinations as combinations of the first images and the second images.

Each provisional deformation which is an output from the viewpoint change elimination unit 12 is a deformation, of the measurement region 2, that includes a random error. The random error included in the provisional deformation which is an output from the viewpoint change elimination unit 12 is eliminated by averaging a plurality of the provisional deformations. The uniting unit 13 averages the above-obtained m*n provisional deformations to eliminate the random errors and outputs the resultant deformation as a deformation of the measurement region 2. The averaging process involves, for example, fixing the point (x, y) on the measurement region and averaging the values of the m*n provisional deformations. In an individual provisional deformation calculated by using an i-th image taken during the first image-taking period and a j-th image taken during the second image-taking period, if a displacement at the point (x, y) on the measurement region is defined as ($u_x$(i, j, x, y), $u_y$(i, j, x, y)), a displacement ($U_x$(x, y), $U_y$(x, y)) at the point (x, y) on the measurement region resulting from the averaging is expressed with the following expression (3).

[Mathematical 3]

$$(U_x(x,y), U_y(x,y)) = (\Sigma_{i,j} u_x(i,j,x,y), \Sigma_{i,j} u_y(i,j,x,y)) \qquad (3)$$

Likewise, if a strain at the point (x, y) on the measurement region is defined as ($\varepsilon_x$(i, j, x, y), $\varepsilon_y$(i, j, x, y)), a strain ($E_x$(x, y), $E_y$(x, y)) at the point (x, y) on the measurement region resulting from the averaging is expressed with the following expression (4).

[Mathematical 4]

$$(E_x(x,y), E_y(x,y)) = (\Sigma_{i,j} \varepsilon_x(i,j,x,y), \Sigma_{i,j} \varepsilon_y(i,j,x,y)) \qquad (4)$$

The uniting unit 13 may average a plurality of provisional deformations selected from among the above-obtained m*n provisional deformations and output the resultant deformation as a deformation of the measurement region 2. If the uniting unit 13 selects, for example, some of the m*n provisional deformations on the basis of a predetermined condition, the accuracy of the deformation of the measurement region 2 to be outputted can be improved. Regarding the predetermined condition, for example, if random errors included in the provisional deformations are sufficiently larger than the actual deformation of the measurement region 2 of the subject, only provisional deformations at which the deformation of the measurement region 2 is small have to be selected. For example, when the defect 4 in the structure 1 is generated near the surface of the measurement region 2 on the opposite side as shown in FIG. 3, the portion of the measurement region 2 that is deformed owing to the defect 4 is limited to a portion of the measurement region 2 that is close to the defect 4, and meanwhile, the displacements at portions of the measurement region 2 that are far from the defect 4 uniformly become approximately zero. Therefore, for the entirety of the measurement region 2, the proportion of the random errors in the provisional deformations is considered to be high. Thus, it can be determined that a provisional deformation with a variance of strains in the entirety of the measurement region 2 being small includes a small random error. Considering this, the uniting unit 13 averages, for example, only provisional deformations with variances of strains in the entirety of the measurement region 2 being smaller than a predetermined threshold value, and outputs the resultant deformation as a deformation of the measurement region 2. Through the above process, the uniting unit 13 outputs, as a deformation of the measurement region 2 between the first image-taking period and the second image-taking period, a deformation resulting from averaging the plurality of provisional deformations selected on the basis of the predetermined condition.

Alternatively, the uniting unit 13 may perform spatial integration in the x-direction and the y-direction on the deformation of the measurement region 2 between the first image-taking period and the second image-taking period, to calculate and output a displacement distribution of the measurement region 2.

Figure 6:
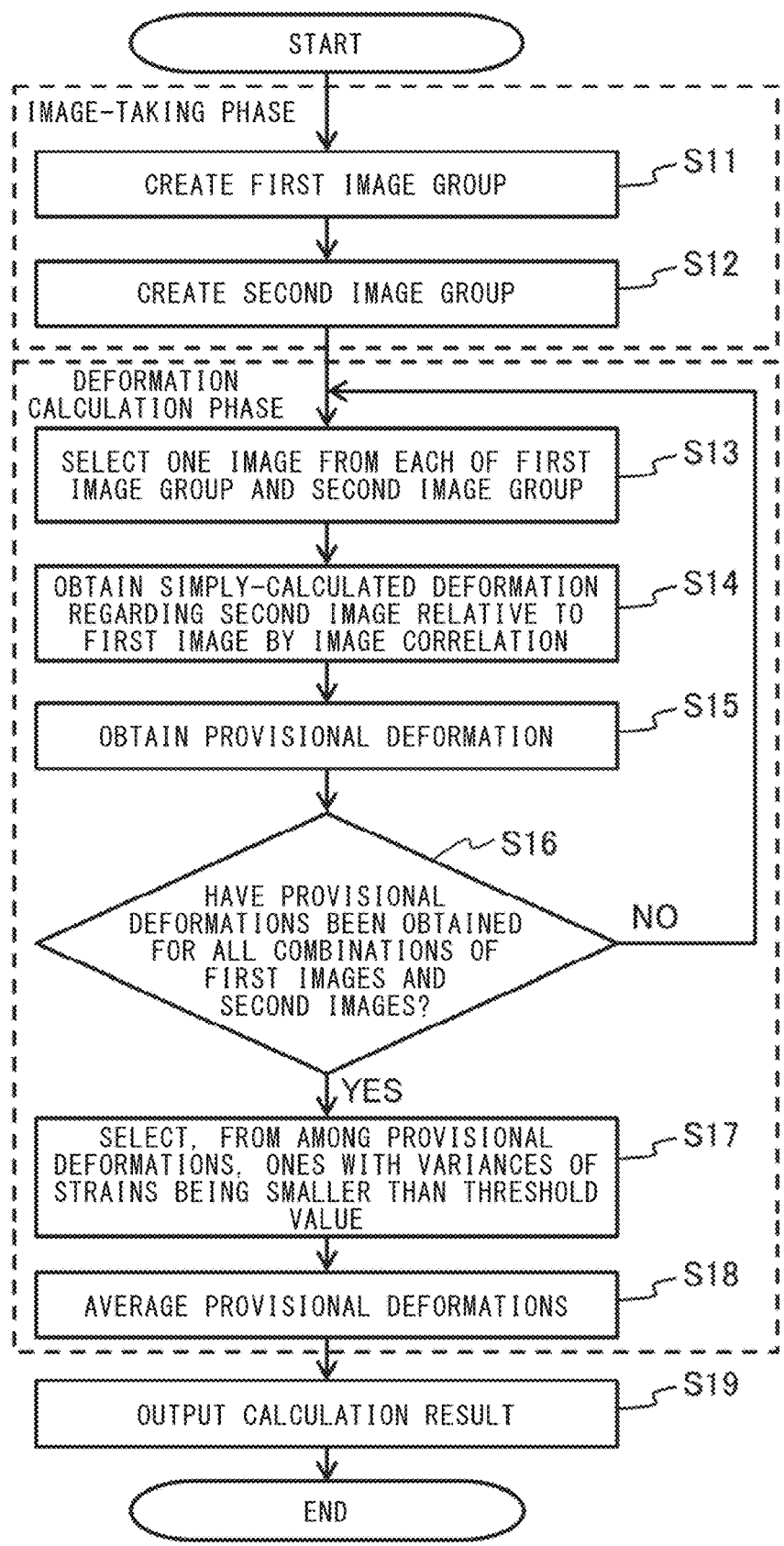
FIG. 6 is a flowchart showing details of a deformation calculation process in embodiment 1.

Next, details of the process of the deformation calculation device 10 will be described with reference to a flowchart. FIG. 6 is a flowchart for explaining the process to be executed by the deformation calculation device 10. Step S11 and step S12 are steps to be executed in an image-taking phase, and step S13 to step S18 are steps to be executed in a deformation calculation phase. Step S11 and step S12 are steps to be executed by the image-taking device 20, step S13, step S14, and step S16 are steps to be executed by the deformation calculation unit 11, step S15 is a step to be executed by the viewpoint change elimination unit 12, and step S17 to step S19 are steps to be executed by the uniting unit 13. Step S11 and step S12 are image-taking steps, step S13 and step S14 are deformation calculation steps, step S15 is a viewpoint change elimination step, and step S17 to step S19 are uniting steps.

In step S11, the image-taking device 20 takes, during the first image-taking period, an image a plurality of times among which the relative position between the image-taking device 20 and the measurement region 2 differs. Thus, the image-taking device 20 creates a first image group composed of the plurality of images. Consequently, the process advances to step S12. In step S12, the image-taking device 20 takes, during the second image-taking period, an image a plurality of times among which the relative position between the image-taking device 20 and the measurement region 2 differs. Thus, the image-taking device 20 creates a second image group composed of the plurality of images. Consequently, the process advances to step S13.

In step S13, the deformation calculation unit 11 selects, as a first image, one image from the first image group and selects, as a second image, one image from the second image group. Consequently, the process advances to step S14. In step S14, the deformation calculation unit 11 calculates, as a simply-calculated deformation, two-dimensional distributions of displacements and strains of the measurement region 2 by digital image correlation with use of the first image and the second image. Consequently, the process advances to step S15. In step S15, the viewpoint change elimination unit 12 obtains a provisional deformation as two-dimensional distributions of displacements and strains of the measurement region 2 on the basis of the simply-calculated deformation, the first image, and the second image. Consequently, the process advances to step S16. In step S16, the deformation calculation unit 11 checks whether or not provisional deformations have been obtained for all the combinations of the first images and the second images. If provisional deformations have not been obtained for all the combinations, the process returns to step S13. Meanwhile, if provisional deformations have been obtained for all the combinations, the process advances to step S17.

In step S17, the uniting unit 13 selects provisional deformations with variances of strains in the entirety of the measurement region 2 being smaller than a predetermined threshold value. Consequently, the process advances to step S18. In step S18, the uniting unit 13 averages the provisional deformations selected in step S17, to obtain a deformation of the measurement region 2. Consequently, the process advances to step S19. In step S19, the uniting unit 13 outputs the deformation of the measurement region 2 obtained in step S18. Consequently, the process is ended.

As described above, the deformation calculation device 10 in embodiment 1 includes: the deformation calculation unit 11 which obtains a simply-calculated deformation of the measurement region 2 by digital image correlation with use of one first image selected from a first image group composed of first images, of the measurement region 2, that are taken from mutually different relative positions during a first image-taking period and one second image selected from a second image group composed of second images, of the measurement region 2, that are taken from mutually different relative positions during a second image-taking period different from the first image-taking period; the viewpoint change elimination unit 12 which obtains a provisional deformation by subtracting, from the simply-calculated deformation, an apparent strain that is back-calculated on an assumption that there is no deformation in the measurement region 2; and the uniting unit 13 which outputs, as a deformation of the measurement region 2 from the first image-taking period to the second image-taking period, a deformation resulting from averaging the provisional deformations obtained by applying the deformation calculation unit 11 and the viewpoint change elimination unit 12 through sequential selection of different ones of the first images from the first image group and sequential selection of different ones of the second images from the second image group. Consequently, a deformation can be calculated through compensation for a change in the position relative to a measurement target with one camera even in the absence of an unmoving reference point.

Embodiment 2

Figure 7:
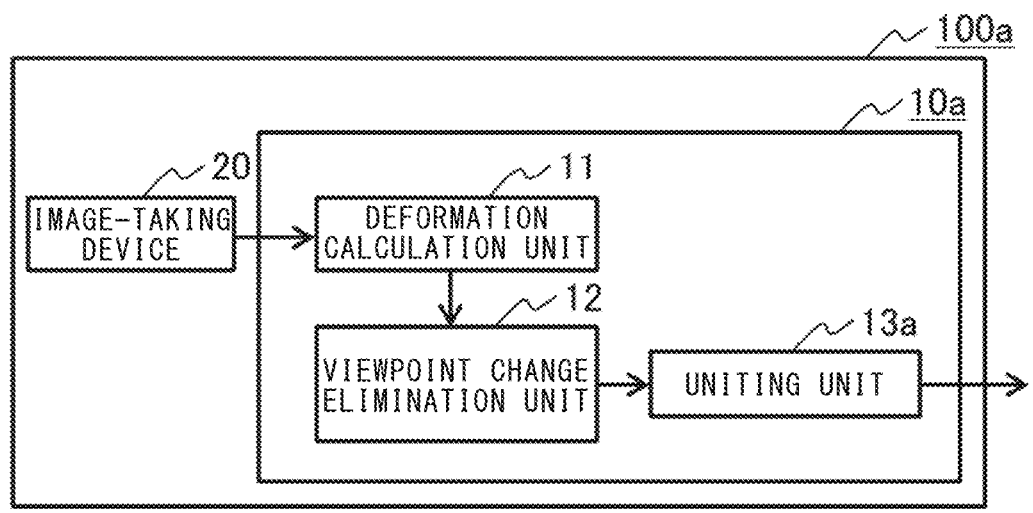
FIG. 7 is a block diagram showing a configuration of a deformation calculation device in embodiment 2.

FIG. 7 shows a configuration of a deformation calculation device 10a in embodiment 2. The deformation calculation device 10a in embodiment 2 shown in FIG. 7 is different from the deformation calculation device 10 in embodiment 1 shown in FIG. 1 in that the uniting unit 13 is replaced with a uniting unit 13a. A deformation measurement device 100a in embodiment 2 includes the deformation calculation device 10a and the image-taking device 20.

Figure 8:
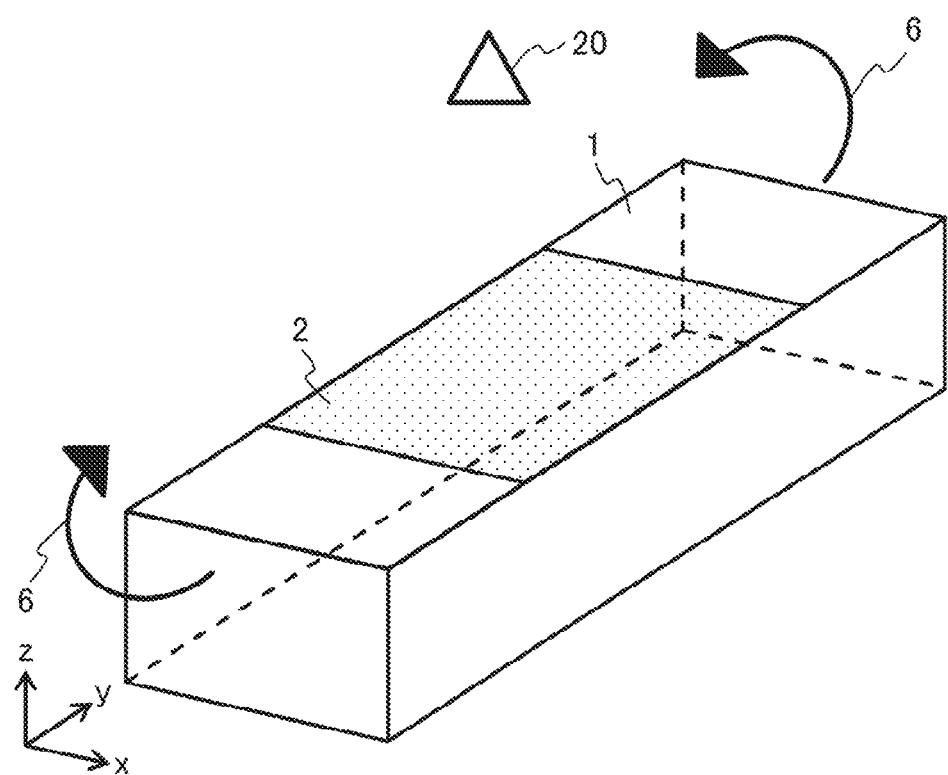
FIG. 8 is a perspective view of the structure to which each of bending moments has been applied, in embodiment 2.
Figure 9:
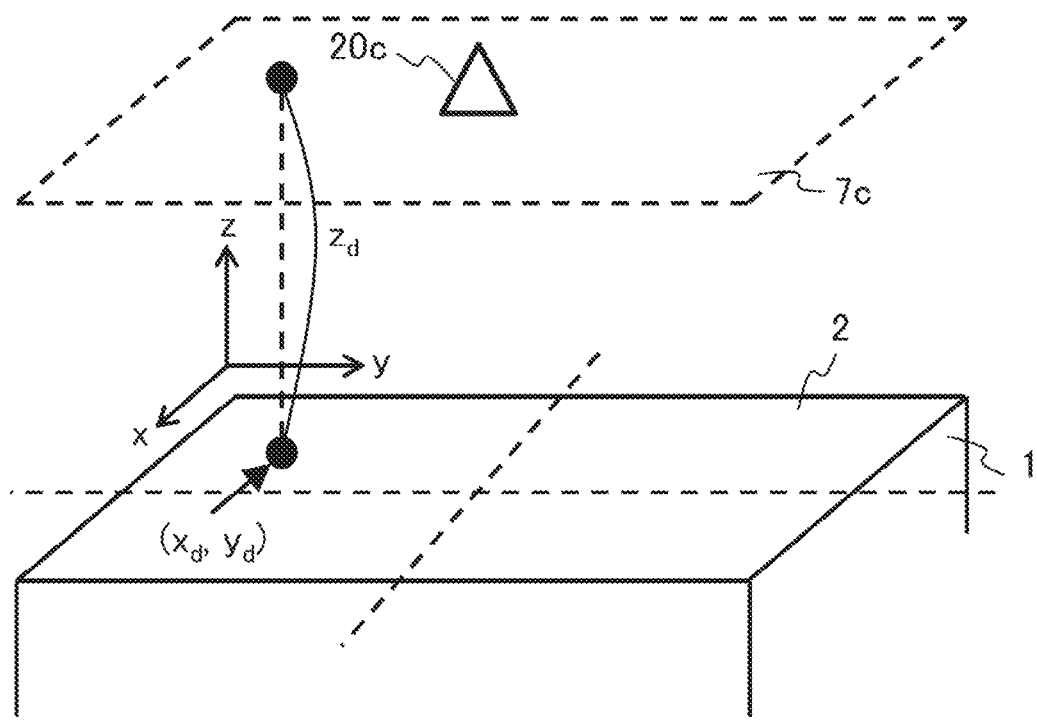
FIG. 9 shows a situation of a measurement region when a first image is being taken during a first image-taking period, in embodiment 2.
Figure 10:
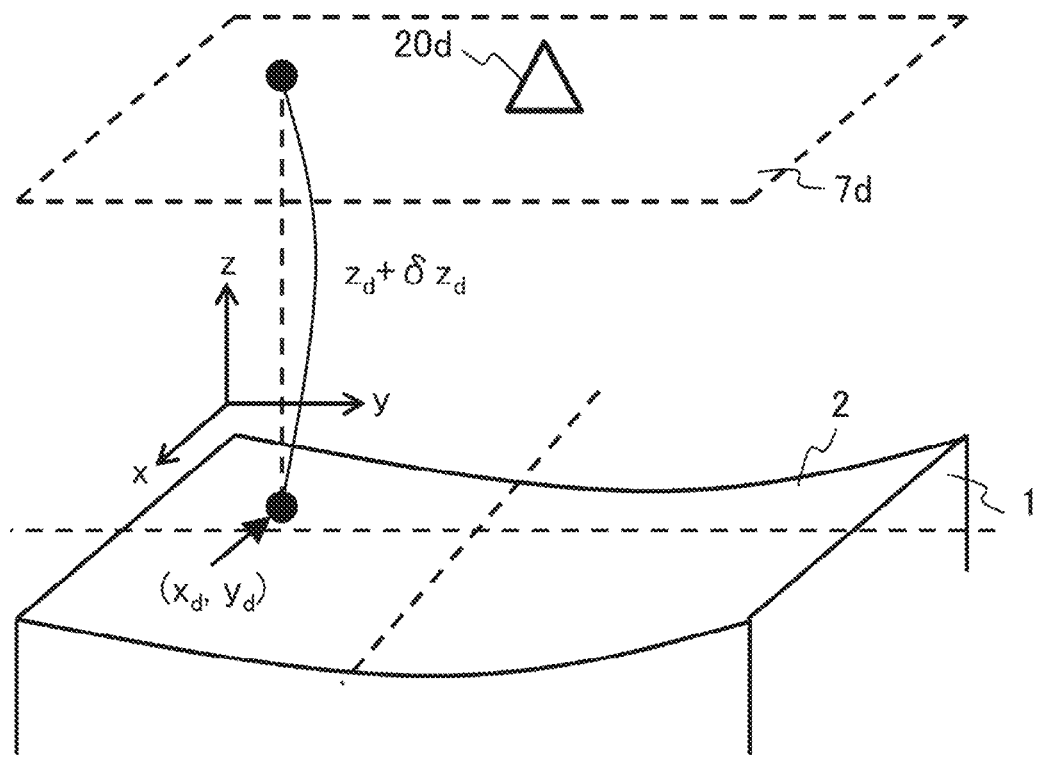
FIG. 10 shows a situation of the measurement region when a second image is being taken during a second image-taking period, in embodiment 2.

In the deformation calculation device 10a in embodiment 2, an out-of-plane displacement of the measurement region 2 of the structure 1 is calculated. The structure 1 to which each of even bending moments 6 has been applied as shown in FIG. 8 is assumed as a subject to be measured, regarding a change in the shape thereof, by the deformation calculation device 10a in embodiment 2. The deformation calculation device 10a calculates a change, in the curvature of the measurement region 2, that occurs when the bending moment 6 applied to the structure 1 differs between the first image-taking period and the second image-taking period. FIG. 9 shows a situation of the measurement region 2 when a first image is being taken during the first image-taking period, and FIG. 10 shows a situation of the measurement region 2 when a second image is being taken during the second image-taking period. As shown in FIG. 9 and FIG. 10, the measurement region 2 having been flat during the first image-taking period is deformed so as to protrude downward along the y-axis through reception of a change in the bending moment 6 during the second image-taking period. In the case of such deformation, a strain of the measurement region 2 during the second image-taking period relative to the measurement region 2 during the first image-taking period is fixed regardless of location. In FIG. 10, the out-of-plane displacement of the measurement region 2 becomes maximum at a center portion of the measurement region 2 and becomes minimum at a peripheral portion thereof. In such a case, the deformation calculation device 10a obtains out-of-plane displacements having different values at respective positions on the measurement region 2, whereby a deformation based on the bending moment 6 applied to the structure 1 can be calculated.

In FIG. 9, the distance between a point $(x_d, y_d)$ on the measurement region 2 and an image-taking plane 7c which is parallel to the measurement region 2 and which includes the position of an image-taking device 20c taking a first image, is $z_d$. As shown in FIG. 10, when the distance between the point $(x_d, y_d)$ on the measurement region 2 and an image-taking plane 7d which is parallel to the measurement region 2 and which includes the position of an image-taking device 20d taking a second image is increased to $z_d+\delta Z_d$, the point $(x_d, y_d)$ is apparently reduced. At this time, the apparent reduction is observed as a negative strain expressed with the following expression (5) regardless of direction.

[Mathematical 5]
$$-\frac{\delta z_d}{z_d} \tag{5}$$

Here, $\delta z_d$ is a value obtained by summing two components which are: a change $\delta z_{d1}$, in the distance between the measurement region 2 and the image-taking device 20, due to a change from the position of the image-taking device 20c in FIG. 9 to the position of the image-taking device 20d in FIG. 10; and an out-of-plane displacement $\delta z_{d2}$ in the measurement region. Out of these components, $\delta z_{d1}$ is a value that is fixed regardless of the position in the measurement region, and $\delta z_{d2}$ is a value that differs depending on the position in the measurement region. In embodiment 2, a change in the curvature of the measurement region 2 is calculated by obtaining $\delta z_{d2}$, and a deformation based on the bending moment 6 applied to the structure 1 is calculated.

In the deformation calculation device 10a in embodiment 2, the processes by the image-taking device 20, the deformation calculation unit 11, and the viewpoint change elimination unit 12 are the same as those in the deformation calculation device 10 in embodiment 1. The uniting unit 13a first performs the same process as that by the uniting unit 13 in the deformation calculation device 10 in embodiment 1. The value of a deformation of the measurement region 2 obtained at this time is a distribution of strains in each of two directions orthogonal to each other on the surface of the measurement region 2 and indicates an apparent enlargement/reduction having occurred owing to an out-of-plane displacement of the measurement region 2. The uniting unit 13a compares the mean value of strains in one direction out of the obtained strains in the two directions or the mean value of the strains in the two directions with the value in expression (5), and eliminates a component, in $\delta z_d$, that has a fixed value in the measurement region. Consequently, the uniting unit 13a calculates the out-of-plane displacement $\delta z_{d2}$ of the measurement region 2.

As described above, the deformation calculation device 10a in embodiment 2 calculates a deformation of the measurement region 2 of the structure 1 to which the even bending moment 6 has been applied. In the deformation calculation device 10a, the uniting unit 13a calculates the mean value of strains in the deformation in one direction on the surface of the measurement region 2 or the mean value of strains in the deformation in the two directions orthogonal to each other on the surface of the measurement region 2, and eliminates, from the calculated mean value, a component having a fixed value in the measurement region 2, to calculate a partial out-of-plane displacement of the measurement region 2. Consequently, an out-of-plane displacement can be calculated through compensation for a change in the position relative to a measurement target with one camera even in the absence of an unmoving reference point.

Embodiment 3

Figure 11:
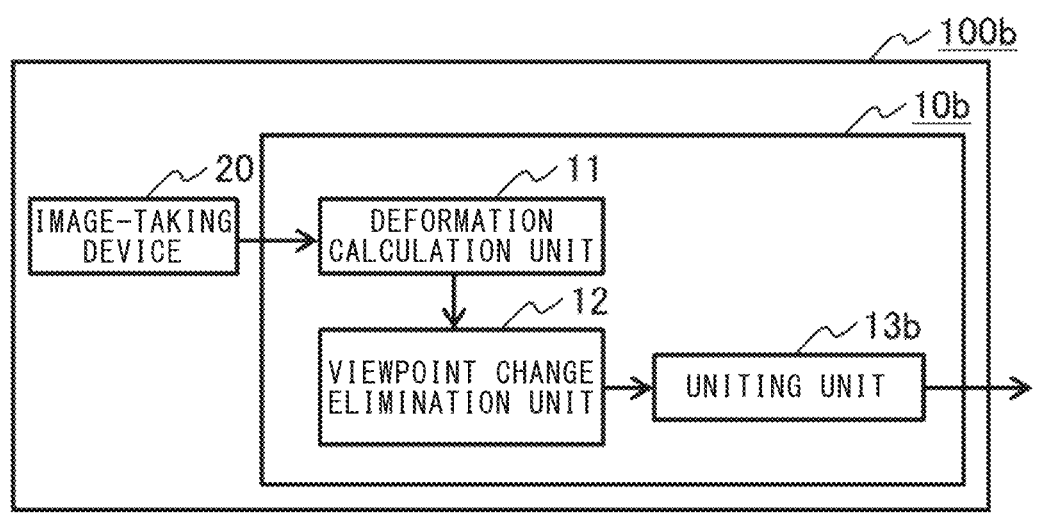
FIG. 11 is a block diagram showing a configuration of a deformation calculation device in embodiment 3.

FIG. 11 shows a configuration of a deformation calculation device 10b in embodiment 3. The deformation calculation device 10b in embodiment 3 shown in FIG. 11 is different from the deformation calculation device 10 in embodiment 1 shown in FIG. 1 in that the uniting unit 13 is replaced with a uniting unit 13b. A deformation measurement device 100b in embodiment 3 includes the deformation calculation device 10b and the image-taking device 20.

The deformation calculation device 10b in embodiment 3 calculates a strain and a displacement of the measurement region 2 in a state where the structure 1 which receives a load due to uniaxial tension or compression has a known Poisson's ratio. In the deformation calculation device 10b, even if the measurement region 2 is evenly deformed, a displacement $\delta z_s$ based on a change in the distance between the measurement region 2 and the image-taking device 20 is estimated, and an even strain generated on the surface of the measurement region 2 owing to the load due to uniaxial tension or compression is calculated.

Figure 12:
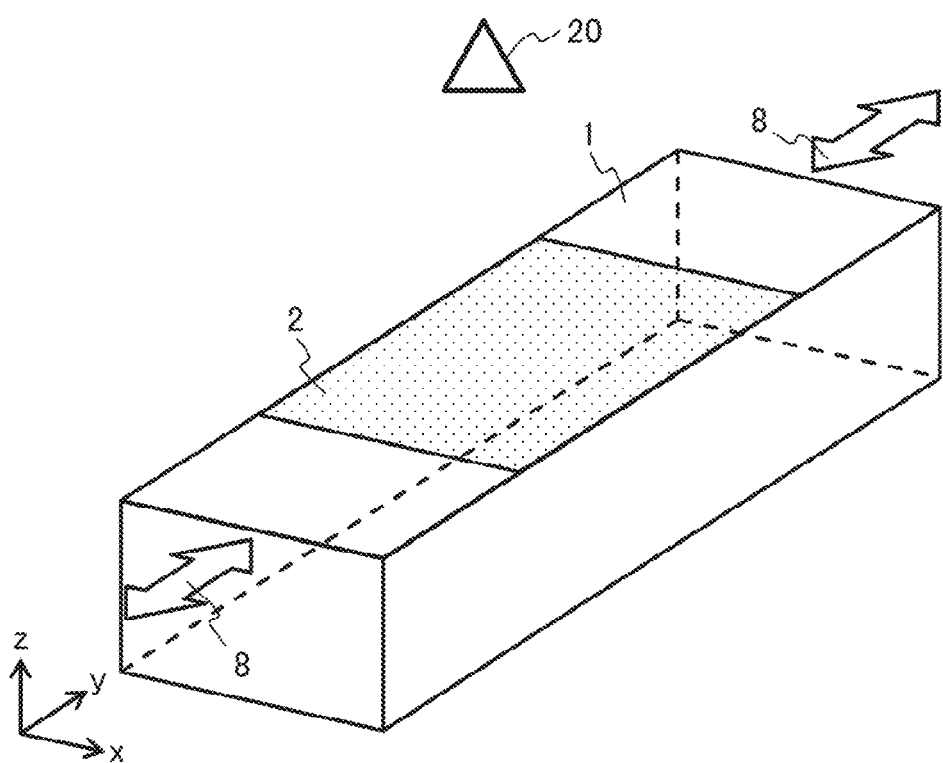
FIG. 12 is a perspective view of the structure to which each of loads due to uniaxial tension or compression has been applied, in embodiment 3.

A structure 1 having received each of loads 8 due to uniaxial tension or compression as shown in FIG. 12 is assumed as a subject to be measured, regarding a change in the shape thereof, by the deformation calculation device 10b in embodiment 3. The direction of the load 8 is a direction parallel to the y-axis, and the deformation calculation device 10b calculates a distribution of strains in each of the x-direction and the y-direction.

In the deformation calculation device 10b in embodiment 3, the processes by the image-taking device 20, the deformation calculation unit 11, and the viewpoint change elimination unit 12 are the same as those in the deformation calculation device 10 in embodiment 1. The uniting unit 13b first performs the same process as that by the uniting unit 13 in the deformation calculation device 10 in embodiment 1. If, in the value of the deformation of the measurement region 2 obtained at this time, a strain in the y-direction as the direction of the load 8 is defined as a first strain $E_y$ and a strain in the x-direction as a direction orthogonal to the direction of the first strain $E_y$ in the measurement region 2 is defined as a second strain $E_x$, $(E_x, E_y)$ is expressed with the following expression (6) and expression (7) by using the out-of-plane displacement $\delta z_e$ and a true strain $(\varepsilon_x, \varepsilon_y)$ generated in the measurement region 2. It is noted that $z_d$ represents the distance between a point on the measurement region 2 and an image-taking plane that is parallel to the measurement region 2 and that includes the position of the image-taking device 20 having taken a first image.

[Mathematical 6]
$$E_x = \varepsilon_x - \frac{\delta z_s}{z_d} \tag{6}$$

[Mathematical 7]
$$E_y = \varepsilon_y - \frac{\delta z_s}{z_d} \tag{7}$$

Here, the relationship between $\varepsilon_x$ and $\varepsilon_y$ is expressed with the following expression (8) by using a Poisson's ratio $\gamma$.

[Mathematical 8]
$$\varepsilon_x = -\gamma \varepsilon_y \tag{8}$$

Judging from above, the relationship between $(E_x, E_y)$ calculated by the deformation calculation device 10b and the true strain $(\varepsilon_x, \varepsilon_y)$ based on the load 8 is expressed with the following expression (9) and expression (10).

[Mathematical 9]
$$\varepsilon_x = \frac{\gamma}{1+\gamma}(E_x - E_y) \quad (9)$$

[Mathematical 10]
$$\varepsilon_y = -\frac{1}{1+\gamma}(E_x - E_y) \quad (10)$$

The uniting unit 13b calculates, according to expression (9) and expression (10), a true strain $(\varepsilon_x, \varepsilon_y)$ generated in the measurement region 2 owing to the load 8 and outputs the true strain $(\varepsilon_x, \varepsilon_y)$.

As described above, the deformation calculation device 10b in embodiment 3 calculates a deformation of the measurement region 2 of the structure 1 which has a known Poisson's ratio and which receives the load 8 due to uniaxial tension or compression. In the deformation calculation device 10b, the uniting unit 13b obtains, as the deformation of the measurement region 2, each of a first strain as a strain in a direction of reception of the load 8 and a second strain as a strain in a direction orthogonal to the direction of the first strain in the measurement region 2, and calculates, from the deformation of the measurement region 2 and the Poisson's ratio, a true strain generated in the measurement region 2. Consequently, a true strain of the measurement region 2 of the structure 1 having a known Poisson's ratio can be calculated through compensation for a change in the position relative to a measurement target with one camera even in the absence of an unmoving reference point.

Figure 13:
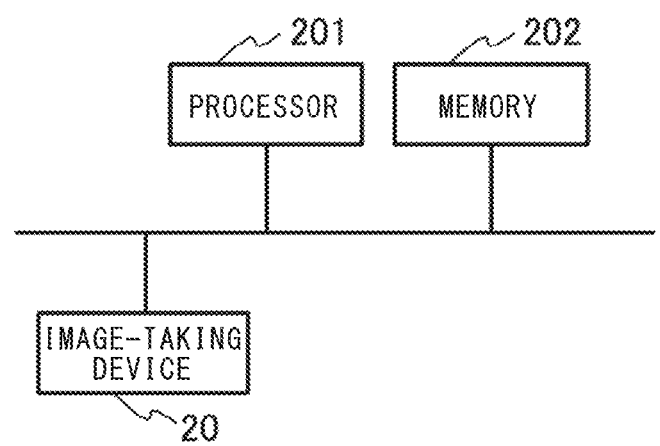
FIG. 13 is a schematic diagram showing an example of hardware of each of the deformation calculation devices in embodiment 1, embodiment 2, and embodiment 3.

FIG. 13 is a schematic diagram showing an example of hardware of each of the deformation calculation devices 10, 10a, and 10b in embodiment 1, embodiment 2, and embodiment 3. The deformation calculation unit 11, the viewpoint change elimination unit 12, and the uniting units 13, 13a, and 13b are each implemented by a processor 201 such as a CPU or a system LSI for executing a program stored in a memory 202. Alternatively, a plurality of processing circuits may execute the above functions through cooperation thereamong. Alternatively, the above functions may be realized by dedicated hardware. In the case where the above functions are realized by dedicated hardware, the dedicated hardware is, for example, a single circuit, a complex circuit, a programmed processor, an ASIC, an FPGA, or a combination of these. The above functions may be realized by a combination of the dedicated hardware and software or a combination of the dedicated hardware and firmware. In the case where the storage unit is provided inside any of the deformation calculation devices 10, 10a, and 10b, the storage unit is implemented by the memory 202. The image-taking device 20, the processor 201, and the memory 202 are connected to each other via a bus.

Embodiment 4

Figure 14:
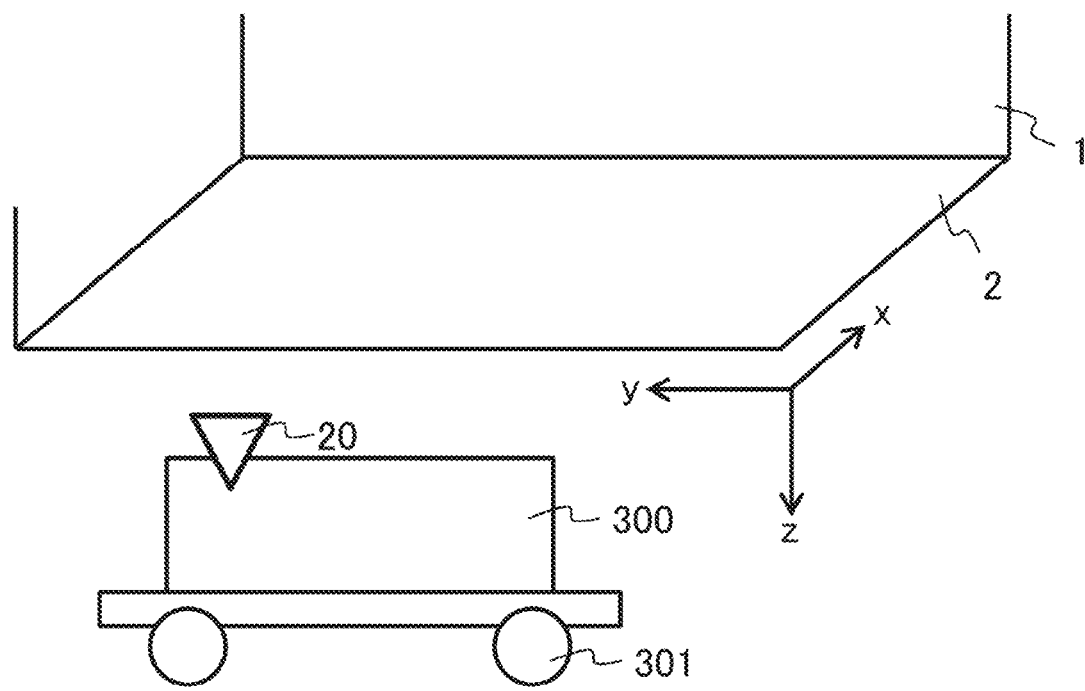
FIG. 14 is a diagram for explaining a configuration of a deformation measurement device in embodiment 4.

FIG. 14 is a diagram for explaining a configuration of a deformation measurement device in embodiment 4. In the deformation measurement device in embodiment 4, the image-taking device 20 is mounted with, for example, a moving device 300 having wheels 301, and images of the measurement region 2 are taken while the image-taking device 20 is moved. The moving means of the moving device 300 is not limited to the wheels 301 and may be, for example, a caterpillar. A deformation of the measurement region 2 is calculated through the method described in any of embodiment 1 to embodiment 3 by using the images acquired by the image-taking device 20 shown in FIG. 14.

The moving device 300 may be mounted with the memory 202 and the processor 201 shown in FIG. 13 so as to obtain a configuration in which the moving device 300 calculates a deformation. Alternatively, hardware having the memory 202 and the processor 201 may be prepared separately from the moving device 300, and the hardware may calculate a deformation on the basis of the images transferred from the moving device 300.

In the deformation measurement device in embodiment 4, a deformation of a measurement region 2 can be measured by using the moving device 300 having a small size through entry into a narrow site in which measurement would be difficult to perform by a human. In addition, the moving device 300 does not need to be accurately positioned at the time of measurement, and thus images for deformation measurement can be acquired in a short time.

Embodiment 5

A deformation calculation device in embodiment 5 calculates a deformation of the measurement region 2 of the structure 1 performing vibration or rotation motion. In the deformation calculation device, a deformation is calculated by using data of the first image group and the second image group which are composed of first and second images, of the measurement region 2, that are taken by the image-taking device 20 having been fixed. Even in a state where the image-taking device 20 is fixed, it is possible to obtain the first image group and the second image group which are composed of first and second images taken such that the relative position of the image-taking device 20 relative to the measurement region 2 differs among the images. In this manner, a deformation can be calculated without moving the image-taking device 20 and without stopping motion of the structure 1, and thus simplification of the measurement device and simplification of the measurement procedure can be realized.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 structure
2 measurement region
3 defect region
4 defect 5 tensile load
6 bending moment
7c, 7d image-taking plane
8 load
10, 10a, 10b deformation calculation device
11 deformation calculation unit
12 viewpoint change elimination unit
13, 13a, 13b uniting unit
20, 20a, 20b, 20c, 20d image-taking device
30 pre-deformation region
31 region having been subjected to deformation involving only displacement
32 region having been subjected to deformation involving displacement and strain
100, 100a, 100b deformation measurement device
201 processor
202 memory
300 moving device
301 wheel

The invention claimed is:

1. A deformation calculation device comprising:
a deformation calculator which obtains a simply-calculated deformation of a measurement region by digital image correlation with use of
one first image selected from a first image group composed of first images, of the measurement region, that are taken from mutually different relative positions during a first image-taking period and
one second image selected from a second image group composed of second images, of the measurement region, that are taken from mutually different relative positions during a second image-taking period different from the first image-taking period;
a viewpoint change eliminator which obtains a provisional deformation by subtracting, from the simply-calculated deformation, an apparent strain that is back-calculated on an assumption that there is no deformation in the measurement region; and
a uniting circuitry which outputs, as a deformation of the measurement region from the first image-taking period to the second image-taking period, a deformation resulting from averaging the provisional deformations obtained by applying the deformation calculator and the viewpoint change eliminator through sequential selection of different ones of the first images from the first image group and sequential selection of different ones of the second images from the second image group.

2. The deformation calculation device according to claim 1, wherein
the uniting circuitry outputs, as the deformation of the measurement region, a deformation resulting from averaging only provisional deformations with variances of strains in an entirety of the measurement region being smaller than a predetermined threshold value among the provisional deformations obtained by applying the deformation calculator and the viewpoint change eliminator to all combinations of the first images and the second images through sequential selection of different ones of the first images from the first image group and sequential selection of different ones of the second images from the second image group.

3. The deformation calculation device according to claim 1, the deformation calculation device being configured to calculate a deformation of the measurement region of a structure to which an even bending moment has been applied, wherein
the uniting circuitry
calculates a mean value of strains in the deformation in one direction on a surface of the measurement region or a mean value of strains in the deformation in two directions orthogonal to each other on the surface of the measurement region, and
eliminates, from the calculated mean value, a component having a fixed value in the measurement region, to calculate a partial out-of-plane displacement of the measurement region.

4. The deformation calculation device according to claim 1, the deformation calculation device being configured to calculate a deformation of a structure having a locally-flat region on a surface thereof, wherein
the flat region is set as the measurement region, and
the viewpoint change eliminator obtains each of the provisional deformations on an assumption that the measurement region has a flat surface.

5. The deformation calculation device according to claim 1, the deformation calculation device being configured to calculate a deformation of the measurement region of a structure that has a known Poisson's ratio and that receives a load due to uniaxial tension or compression, wherein
the uniting circuitry
obtains, as the deformation of the measurement region, each of a first strain as a strain in a direction of reception of the load and a second strain as a strain in a direction orthogonal to the direction of the first strain in the measurement region, and
calculates, from the deformation of the measurement region and the Poisson's ratio, a true strain generated in the measurement region.

6. A deformation measurement device comprising:
the deformation calculation device according to claim 1; and
an image-taking device which takes images for the first image group and the second image group.

7. A deformation measurement device comprising:
the deformation calculation device according to claim 1;
an image-taking device which takes images for the first image group and the second image group; and
a moving device which moves the image-taking device.

8. The deformation calculation device according to claim 1, wherein
a plurality of still images extracted from a moving image, of the measurement region, that is taken during the first image-taking period compose the first image group, and
a plurality of still images extracted from a moving image, of the measurement region, that is taken during the second image-taking period compose the second image group.

9. The deformation calculation device according to claim 1, the deformation calculation device being configured to calculate a deformation of the measurement region of a structure that is vibrating or rotating, wherein
the deformation is calculated by using the first image group and the second image group which are composed of first and second images, of the measurement region, that are taken by an image-taking device having been fixed.

10. A deformation calculation method comprising:
a deformation calculation obtaining a simply-calculated deformation of a measurement region by digital image correlation with use of
one first image selected from a first image group composed of first images, of the measurement region, that are taken from mutually different relative positions during a first image-taking period and one second image selected from a second image group composed of second images, of the measurement region, that are taken from mutually different relative positions during a second image-taking period different from the first image-taking period;

a viewpoint change elimination obtaining a provisional deformation by subtracting, from the simply-calculated deformation, an apparent strain that is back-calculated on an assumption that there is no deformation in the measurement region; and an outputting, as a deformation of the measurement region from the first image-taking period to the second image-taking period, a deformation resulting from averaging the provisional deformations obtained by applying the deformation calculation and the viewpoint change elimination through sequential selection of different ones of the first images from the first image group and sequential selection of different ones of the second images from the second image group.

11. A deformation measurement device comprising:

an image-taking device which takes images of a measurement region from mutually different relative positions during a first image-taking period, to output a first image group composed of first images, and takes images of the measurement region from mutually different relative positions during a second image-taking period different from the first image-taking period, to output a second image group composed of second images;

a distance measurement device which measures a change that is a change, in at least one direction, in a relative position between the image-taking device and the measurement region and that occurs between the first image-taking period and the second image-taking period;

a deformation calculator which obtains a simply-calculated deformation of the measurement region by digital image correlation with use of one first image selected from the first image group and one second image selected from the second image group;

a viewpoint change eliminator which obtains a provisional deformation by subtracting, from the simply-calculated deformation, an apparent strain that is back-calculated on an assumption that there is no deformation in the measurement region, by using information about the change in the relative position; and a uniting circuitry which outputs, as a deformation of the measurement region from the first image-taking period to the second image-taking period, a deformation resulting from averaging the provisional deformations obtained by applying the deformation calculator and the viewpoint change eliminator through sequential selection of different ones of the first images from the first image group and sequential selection of different ones of the second images from the second image group.

12. A deformation measurement device comprising:

an image-taking device which takes images of a measurement region from mutually different relative positions during a first image-taking period, to output a first image group composed of first images, and takes images of the measurement region from mutually different relative positions during a second image-taking period different from the first image-taking period, to output a second image group composed of second images;

an orientation measurement device which measures a change, in an orientation of the image-taking device, that occurs between the first image-taking period and the second image-taking period;

a deformation calculator which obtains a simply-calculated deformation of the measurement region by digital image correlation with use of one first image selected from the first image group and one second image selected from the second image group;

a viewpoint change eliminator which obtains a provisional deformation by subtracting, from the simply-calculated deformation, an apparent strain that is back-calculated on an assumption that there is no deformation in the measurement region, by using information about the change in the orientation; and a uniting circuitry which outputs, as a deformation of the measurement region from the first image-taking period to the second image-taking period, a deformation resulting from averaging the provisional deformations obtained by applying the deformation calculator and the viewpoint change eliminator through sequential selection of different ones of the first images from the first image group and sequential selection of different ones of the second images from the second image group.

* * * * *